United States Patent
Schürg

(10) Patent No.: US 7,568,759 B2
(45) Date of Patent: Aug. 4, 2009

(54) PASSENGER SEAT, AN AIRCRAFT PASSENGER SEAT IN PARTICULAR, AND A PASSENGER SEAT GROUP, AN AIRCRAFT PASSENGER SEAT GROUP IN PARTICULAR

(75) Inventor: Hartmut Schürg, Schwäbisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 24 days.

(21) Appl. No.: 11/270,897

(22) Filed: Nov. 10, 2005

(65) Prior Publication Data

US 2007/0085389 A1   Apr. 19, 2007

(30) Foreign Application Priority Data

Dec. 21, 2004 (DE) ........................ 10 2004 061 471

(51) Int. Cl.
*B60N 2/46* (2006.01)
(52) U.S. Cl. ................... 297/184.1; 297/188.16
(58) Field of Classification Search ................. 297/145, 297/184.1, 188.16, 188.17
See application file for complete search history.

(56) References Cited

U.S. PATENT DOCUMENTS

| | | | | |
|---|---|---|---|---|
| 3,833,257 A | * | 9/1974 | Dove | 297/284.1 |
| 5,857,745 A | * | 1/1999 | Matsumiya | 297/354.13 |
| 5,992,798 A | * | 11/1999 | Ferry | 244/118.6 |
| 6,046,754 A | * | 4/2000 | Stanek | 345/169 |
| 6,170,786 B1 | * | 1/2001 | Park et al. | 248/274.1 |
| 6,220,658 B1 | * | 4/2001 | Lukawski et al. | 297/145 |
| 6,347,590 B1 | * | 2/2002 | D'Annunzio et al. | 108/44 |
| 6,644,736 B2 | * | 11/2003 | Nguyen et al. | 297/184.17 |
| 7,178,871 B1 | * | 2/2007 | Round et al. | 297/244 |
| 2003/0085597 A1 | | 5/2003 | Ludeke | |
| 2005/0194827 A1 | * | 9/2005 | Dowty et al. | 297/411.3 |
| 2008/0265638 A1 | * | 10/2008 | Strasser et al. | 297/217.1 |

FOREIGN PATENT DOCUMENTS

| | | |
|---|---|---|
| DE | 195 41 567 C1 | 1/1997 |
| DE | 101 32 282 A1 | 1/2003 |
| EP | 1 236 642 A2 | 9/2002 |
| WO | WO 00/21831 | 4/2000 |

* cited by examiner

*Primary Examiner*—Joseph F Edell
(74) *Attorney, Agent, or Firm*—Posz Law Group, PLC

(57) ABSTRACT

A passenger seat, an aircraft passenger seat in particular, has seat components such as a seat element (1), a backrest (3), and an arm rest (5). At least one component is mounted so as to be movable for adjustment of its position in relation to that of other seat components. A partition (19) is movable at option into a use position in which it extends into a lateral screen area of the seat and into a non-use position in which it clears the screen area. The partition (19) is connected to an associated arm rest (5) and may be moved between a non-use position and a use position by movement of the arm rest (5), changing the adjusted position of the arm rest (5).

24 Claims, 2 Drawing Sheets

Figure 1:
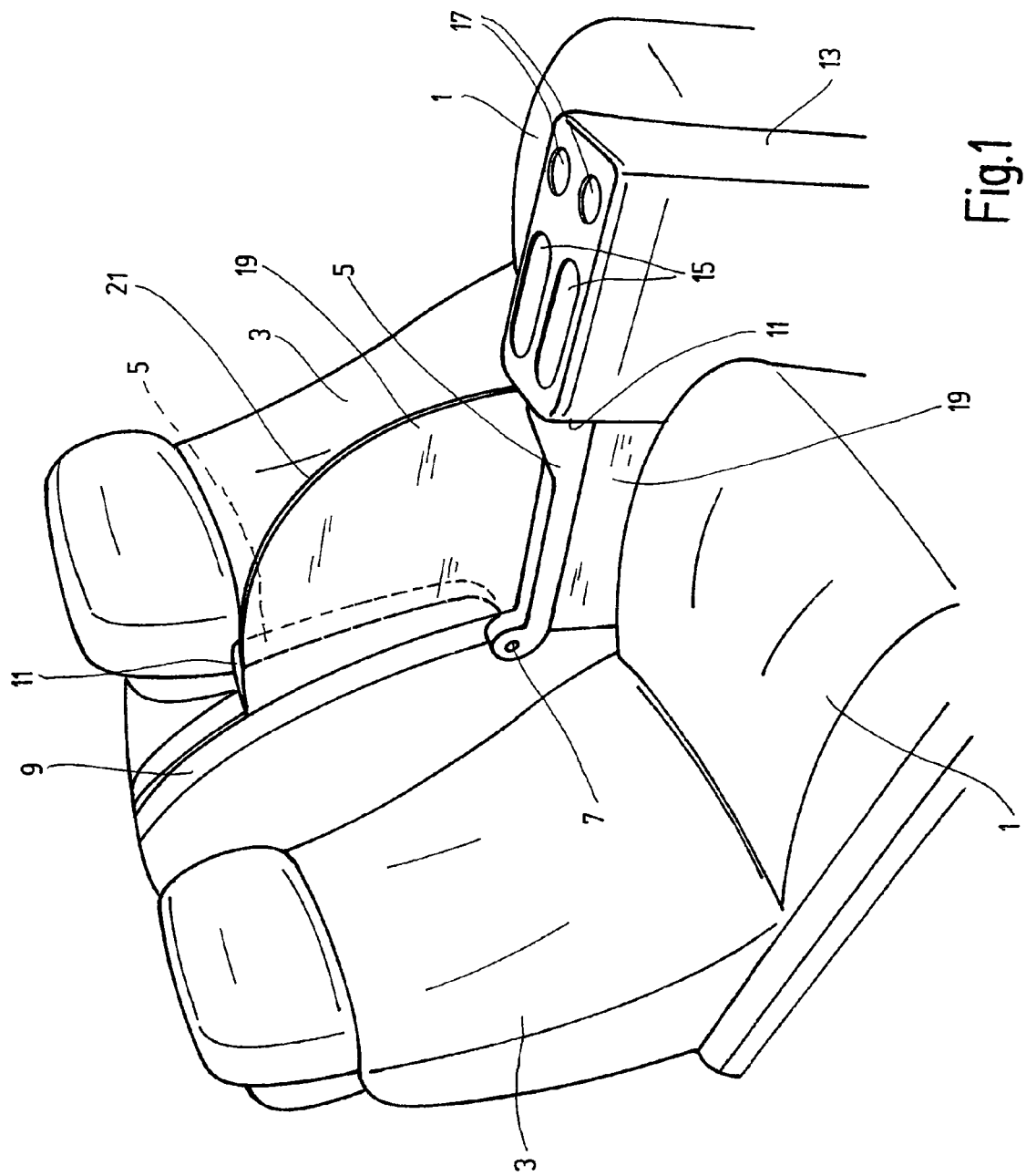

PASSENGER SEAT, AN AIRCRAFT PASSENGER SEAT IN PARTICULAR, AND A PASSENGER SEAT GROUP, AN AIRCRAFT PASSENGER SEAT GROUP IN PARTICULAR

The invention relates to seating systems for passenger transportation by conveyances such as buses, ferries, and especially passenger aircraft.

As is known, in configuration of seating systems for passenger transportation the aim is pursued of providing the highest degree of comfort for the seat occupant. The possibility provided of adjusting the position of seat components to enable the seat occupant to move the backrest and/or arm rest to adjusted positions meeting his needs, for example, as a function of whether the seat occupant wishes to occupy a normal seat position or resting or sleeping position makes a good contribution to seating comfort. On the other hand, an effort is made to meet the comfort requirements of the seat occupant also by affording him the opportunity of screening his seat area from adjacent surrounding areas so that the seat occupant is afforded a certain degree of privacy. As has been set forth in DE 101 32 282 A1, provision of aircraft passenger seats with a movable partition which may at option be moved to a use position in which it extends into a side screen area of the seat and to a non-use position in which this screen area is cleared has been disclosed.

On the basis of this prior art the object of the invention is to make available a passenger seating system which both meets the requirements set for the comfort afforded the seat occupant and is characterized especially by a simple, light-weight structure that is easy to use.

In connection with a first aspect of the invention this object is attained by a passenger seat, an aircraft passenger seat in particular, having the features specified in claim 1 in its entirety.

In that, as specified in the characterizing part of claim 1, the partition serving the purpose of forming a private area is connected to an adjustable-position arm rest of the seat and may be adjusted by movement of the arm rest to its screening use position or to its non-use position clearing the screen area, both works to the advantage of especially simple and comfortable handling and presents the particular advantage that, when the arm rest has been folded up, the seat is nevertheless widened in this area, this creating additional shoulder freedom, since parts of the arm rest may be used to widen the backrest.

The solution claimed for the invention may be configured so that the arm rest carries the partition with it when it is folded up, but the possibility also exists of separating the partition from the arm rest and leaving it down, for example, in the center console between two adjacent seats of a row. For this purpose the arm rest may be connected to the partition by way of a catch or clip device, it then being possible to sever the connection manually. A light-weight structure may also be achieved by providing no special positioning and/or control means of any nature for establishing an effective connection between adjustment movement of the arm rest and adjustment movement of the partition. The possibility also exists, however, of providing such means, electronic and/or pneumatic devices being used.

A second aspect of the invention is that the object of the invention stated in the foregoing is attained by a passenger seat group, an aircraft passenger seat group in particular, having the characteristics specified in claim 2 in its entirety.

In that, in the seat group claimed for the invention, the partition forms a partition element between two adjacent seats when it is in the non-use position, there is to be added to the advantage of increased comfort resulting from creation of a private area at the option of the seat occupant the additional advantage of a simplified, light-weight structure resulting from elimination of the center console customarily provided as partition element between adjacent seats. The seat group claimed for the invention is especially well suited for use in aircraft because of the corresponding saving of weight.

Since each of the adjacent seats has its own partition in the area of transition between the seats the partition of which may be adjusted independently of the partition of the other seat, each of the occupants of the two adjacent seats has the option of separating the areas in the lateral screen area for creation of a private area or in the area where separation is customarily effected by a center console optionally present.

By preference each seat of two juxtaposed seats has in the transitional area a separate arm rest which may be moved for adjustment of its position independently of the adjacent arm rest of the other seat. A partition is connected to each arm rest and may be transferred between non-use position and use position of the respective arm rest.

In one especially advantageous design the partition is in the form of a structural component such as a thin flat plate or panel.

If the arm rests connected by a partition may be pivoted on their end adjacent to the backrest about a vertical axis perpendicular to the longitudinal axis of the seat between a more or less horizontal use position and a folded-up position in the vicinity of the area of the backrest, in one preferred exemplary embodiment the partition is mounted on the arm rest in such a way that it extends along the plane of pivoting movement of this partition. Since the partition thus remains in a plane extending longitudinally between the seats when the position of the arm rest is adjusted, a stationary connection can be provided between partition and respective arm rest.

By preference the edge of the partition connected to the respective arm rest extends to the front end of the arm rest so that the latter, when in the folded-up position, defines the highest point of the screen area and the rearward limit of this area.

Figure 2:
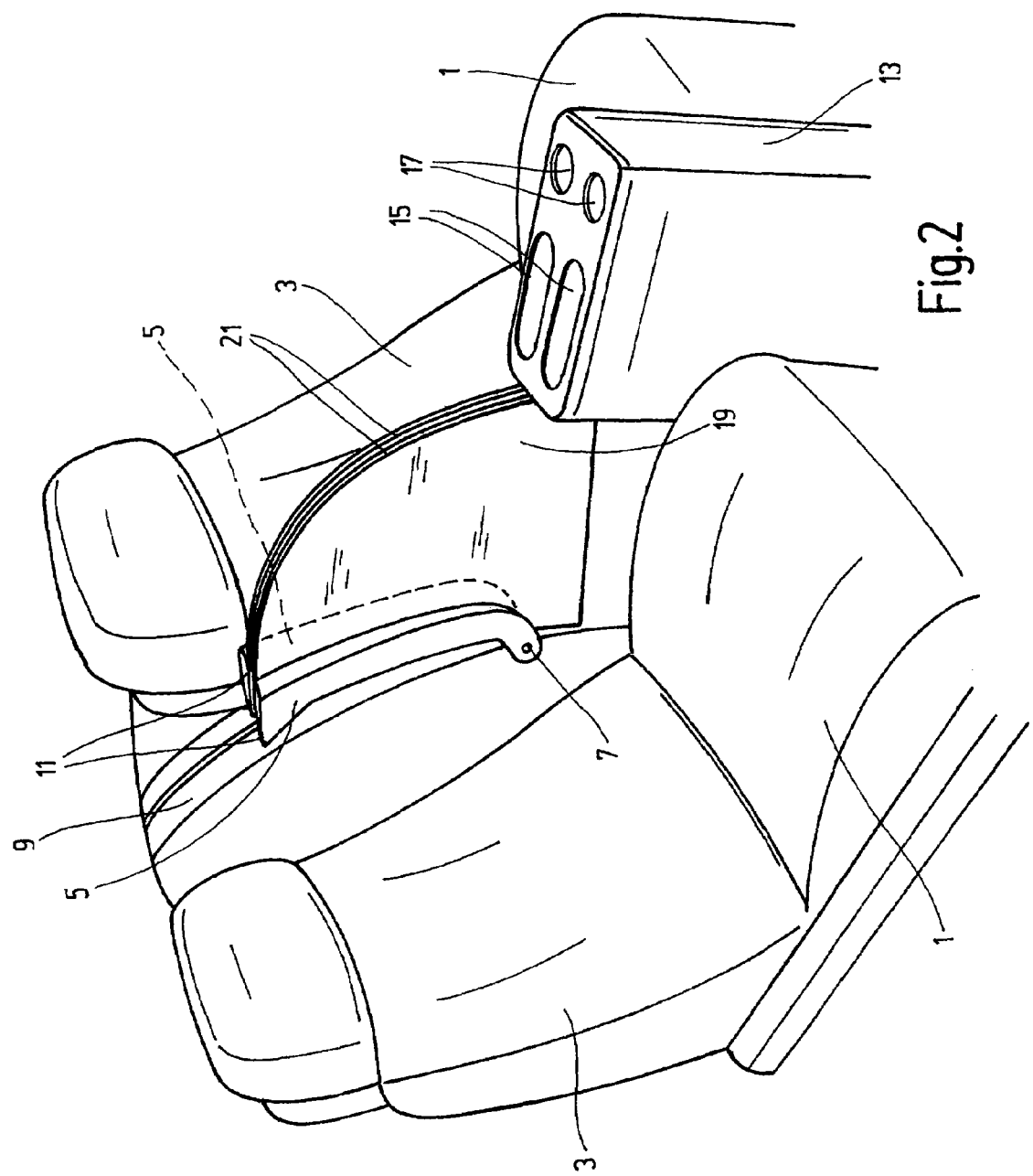

The invention is described in detail below on the basis of an aircraft passenger seat group with reference to the drawing, in which FIG. 1 presents a perspective diagonal view of a greatly simplified diagram of two seats of an aircraft passenger seat group positioned side by side; only some of the seat components essential for illustration of the invention are shown and a partition of one of the seats in the non-use position and the partition of the other seat in the use position are shown, and FIG. 2 presents a diagram corresponding to that of FIG. 1, but with partitions of both seats shown in the use position.

In the drawing the seat components of two seats mounted side by side are identified by 1, their backrests by 3, and their arm rests by 5. The arm rests 5 are mounted on a support structure 9, which is also part of the backrest support (also not shown), so as to be pivotable about a pivot axis 7. When the seat group in an aircraft cabin is in the standard installed position, the pivot axis 7 extends horizontally and vertically in relation to the longitudinal direction of a seat (or direction of flight).

There is no center console separating the seat components 3 in the area below the arm rests 5, which may be pivoted independently of each other. When the arm rest 5 of the seat shown on the left in FIG. 1 is in the horizontal position, the front end 11 of the arm rest extends as far as a console front 13 which begins in the front edge area of the seat components 1 and extends forward over the seat components. The upper side of the arm rests 5 forms a transitional surface extending to the upper side of the console front 13, in which there are receptacle recesses 15 and 17.

There is on each arm rest 5 a plate-shaped partition, such as one in the form of a preferably opaque plastic panel, fastened so that the partitions 19 extend in close proximity to each other when only one is released for the area of play suitable for the adjustment movements. FIG. 1 shows the partition 19 for the seat positioned on the left in the illustration in the non-use position, which it assumes when the associated arm rest 5 is in the horizontal position. The partition 19 here forms, in the console-free area between console front 13 and the backrest area, a partition between the two seat components 1 as a substitute for a center console not present in this area. As shown in FIG. 1, the partition 19 is substantially thinner than the armrest 5.

When the respective arm rest 5 is in the folded-up position, the associated partition 19, which is connected to the arm rest 5 so that it moves in the plane of the pivot movement, extends into a screen area between the two seats. The highest position of the screen area is here defined by the front end 11 of the arm rest 5 when in the folded-up position. The adjoining edge 21 of the partition 19 extends from this upper end, concentrically with the pivot axis 7, in an arc toward the front and down, so that this edge 21 of the partition 19 defines the front limit of the screen area.

As has already been indicated, in the illustration in FIG. 1 the partition 19 associated with the seat on the left is in its non-use position when the arm rest 5 is in the use position. In this instance the screen area is delimited only by the partition 19 fastened on the folded-up arm rest 5 of the seat situated on the right. Folding the respective arm rest 5 up causes increase in the useable width of the seat area within the range of at least two inches, since the partition 19 is displaced toward the adjacent seat from the longitudinal center line of the arm rest. In other words, as shown in FIG. 1, the partition 19 is laterally offset from a longitudinal center line of the arm rest 5 in a direction away from said back rest 3 and the seat element 1 of the seat associated with the arm rest 5. Consequently, transfer of the partition 19 to the use position not only creates a private area for the seat occupant but also effects widening of the seat area; the absence of an arm rest 5 in the use position is to be taken into account, but this is not a major consideration if the seat occupant is in the resting or reclining position, in which he can only with difficulty reach the resting position of the arm rest.

The horizontal use position of the arm rest 5, which corresponds to the non-use position of the respective partition 19, may be defined by stops (not shown), such as a shoulder stop on the console front 13, on which the front end 11 of the arm rest 5 is placed by the force of gravity. When it is in the folded-up position corresponding to the use position of the partition 19, the arm rest 5 may be detachably positioned on the pivot bearing on the axis 7 by means of a latch device (not shown). As an alternative, fastening elements (not shown) may effect detachable connection of the folded-up arm rest 5 on the support structure 9, for example, in conjunction with a cover material on the arm rest 5 and/or on the support structure 9.

The possibility also exists of effecting separation of partition 19 from the arm rest 5 by way of a manually operated catch or clip device (not shown), so that the arm rest 5 may also be folded up alone. In all the solutions illustrated the possibility exists of introducing the respective partition 19 into a center console (not shown) between the two adjacent seats 1. The possibility also exists of providing adjacent seats 1 with only one arm rest 5 having a partition 19, something which of course presumes agreement of two adjacent seat occupants in a row regarding the positioning involved. Appropriate positioning or control means (not shown) also create the possibility of returning the arm rest 5 with the associated partition element 19 to the rest or reclining position when the backrest is swung to this position. The occupant of the adjacent seat does not receive a psychological impression of rejection from raising of the partition 19. This also applies when the arm rest 5 is folded up by hand to a position which the occupant of the adjacent seat knows from his own experience is necessary in order to effect corresponding widening of the seat in the area of the backrest.

The invention claimed is:

1. A passenger seat, comprising:
a seat element, which forms a seating surface;
a back rest coupled to said seat element;
an arm rest having front and rear ends and being pivotally mounted at said rear end adjacent said back rest so that the arm rest is movable relative to the seating surface in a plane of pivoting movement; and
a privacy partition fixedly connected to and depending from below said arm rest for simultaneous movement therewith between a partition use position extending into a lateral screen area of said seat element and said back rest and a partition non-use position clearing said screen area, wherein
the privacy partition creates a private area at the option of a seat occupant; and
the privacy partition is substantially thinner than the arm rest, in a direction perpendicular to the plane of pivoting movement.

2. A passenger seat according to claim 1 wherein
a front console extends from said front end of said arm rest in said partition non-use position and from adjacent a front edge of said seat element;
the front console extends above the seating surface formed by the seat element; and
said privacy partition extends below said arm rest and between said front console and said back rest adjacent a side of said seat element in said partition non-use position.

3. A passenger seat according to claim 2, wherein the upper side of said arm rest forms a transitional surface extending to an upper side of said front console.

4. A passenger seat according to claim 1 wherein said privacy partition is a flat, thin plate.

5. A passenger seat according to claim 4 wherein said arm rest is pivotal about a horizontal axis perpendicular to a longitudinal axis of said seat between a substantially horizontal use position and a folded-up position adjacent said back rest; and said privacy partition extends from said arm rest in the plane of pivoting movement.

6. A passenger seat according to claim 5 wherein said privacy partition includes an edge extending from said front end of said arm rest to define a highest point thereof in said lateral screen area in the folded-up position of said arm rest.

7. A passenger seat according to claim 6 wherein said edge includes an arcuate section concentric with said pivot axis thereof and extending from said arm rest to form a front limit of said screen area.

8. A passenger seat according to claim 1 wherein said privacy partition is laterally offset from a longitudinal center line of said arm rest in a direction away from said back rest and said seat element.

9. A passenger seat according to claim 1 wherein
a front console, which is adjacent a front edge area of said seat element, extends above the seating surface, the arm rest, in the partition non-use position, extends forwardly with the front end of the arm rest extending up to the front console, and the partition extends below the arm rest, between the front console and the back rest and adjacent a side of the seat element in the partition non-use position.

10. A passenger seat, comprising:

a seat element forming a seating surface;

a back rest coupled to the seat element;

an arm rest having front and rear ends and being pivotally mounted at the rear end adjacent the back rest, so that the arm rest is movable in a plane of pivoting movement relative to the seating surface; and a privacy partition fixedly connected to and depending from below the arm rest for simultaneous movement therewith between a partition use position extending into a lateral screen area of the seat element and the back rest and a partition non-use position clearing the screen area, wherein the privacy partition, in the partition non-use position, extends below the arm rest between the back rest and the front end of the arm rest and extends in a region lower than the seating surface and adjacent a side of the seat element, the privacy partition creates a private area at the option of a seat occupant; and the privacy partition is substantially thinner than the arm rest, in a direction perpendicular to the plane of pivoting movement.

11. A passenger seat according to claim 1, wherein the privacy partition depends from the arm rest for simultaneous movement therewith between the partition non-use position and the partition use position.

12. A passenger seat according to claim 1, wherein the arm rest is tiltable between a substantially horizontal use position and a folded-up non-use position adjacent said back rest, and the privacy partition is in its use position when the arm rest is in its folded-up position.

13. A passenger seat according to claim 1, wherein the arm rest is tiltable between a substantially horizontal use position and a folded-up non-use position adjacent said back rest, and the privacy partition is in the partition non-use position when the arm rest is in the substantially horizontal use position.

14. A passenger seat according to claim 1, wherein the arm rest is tiltable between a substantially horizontal use position and a folded-up non-use position adjacent said back rest, wherein the arm rest shows a side surface which is oriented substantially vertically and faces said seat surface, the side surface delimiting in a transverse direction of the seat element a first seat area useable by a passenger seating on the seat surface in the use position of the arm rest, in the folded-up non-use position of the arm rest, the privacy partition delimits in the transverse direction a second seat area useable by a passenger seating on the seat surface, and the second seat area is wider than the first seat area in the transverse direction.

15. A passenger seat according to claim 1, wherein the privacy partition is formed as a wall part that is fixed to the arm rest, so that the wall part pivots integrally with the arm rest.

16. A passenger seat according to claim 15, wherein the arm rest has a longitudinal direction, and the wall part has a contact surface, which is permanently affixed to the arm rest, and the contact surface extends in the longitudinal direction of the arm rest.

17. A passenger seat group, comprising:

first and second passenger seats mounted laterally adjacent to one another, each said seat having a seat element and a back rest;

a transition area between said seats;

a first arm rest in said transition area having front and rear ends and being pivotally mounted at said rear end so that the arm rest is movable relative to the seating surface in a plane of pivoting movement; and a first privacy partition fixedly connected to and depending from below said first arm rest for simultaneous movement therewith between a first partition use position extending in a first lateral screen area between said first and second seats and a first partition non-use position clearing said first screen area, wherein the first privacy partition creates a private area at the option of a seat occupant, and said first privacy partition is substantially thinner than said first arm rest in a direction perpendicular to the plane of pivoting movement.

18. A passenger seat group according to claim 17 wherein a second arm rest is in said transition area, has front and rear ends, and is pivotally mounted at said rear end thereof, said second arm rest being movable independently of said first arm rest; and a second privacy partition is fixedly connected to and depends from said second arm rest for simultaneous movement therewith between a second partition use position extending in a second lateral screen area between said first and second seats and a second partition non-use position clearing said second screen area, said second privacy partition being substantially thinner than said second arm rest.

19. A passenger seat group according to claim 18 wherein each said privacy partition is a flat, thin plate.

20. A passenger seat group according to claim 19 wherein said arm rests are pivotal about horizontal axes perpendicular to longitudinal axes of said seats between substantially horizontal use positions and folded-up positions adjacent said back rests; and each said privacy partition extends from the respective arm rest in the plane of pivoting movement.

21. A passenger seat group according to claim 20 wherein each said privacy partition includes an edge extending from said front end of the respective arm rest to define a highest point thereof in the respective lateral screen area in the folded-up position of the respective arm rest.

22. A passenger seat group according to claim 21 wherein each said edge includes an arcuate section concentric with said pivot axis thereof end extending from the respective arm rest to form a front limit of the respective screen area.

23. A passenger seat group according to claim 19 wherein each said privacy partition is laterally offset from a longitudinal center line of the respective arm rest, said privacy partitions extending in close proximity to one another with only necessary play for movement of said privacy partitions therebetween.

24. A passenger seat group according to claim 23 wherein each said privacy partition is laterally offset in a direction away from the respective back rest and seat element.

* * * * *